United States Patent [19]
Holman

[11] Patent Number: 4,690,449
[45] Date of Patent: Sep. 1, 1987

[54] ROTATING CHILD'S SEAT

[76] Inventor: Tommy E. Holman, 8974 Marlow St., Shreveport, La. 71118

[21] Appl. No.: 821,856

[22] Filed: Jan. 23, 1986

[51] Int. Cl.$^4$ .............................................. B60N 1/12
[52] U.S. Cl. .................................. 296/65 R; 296/63; 296/37.16
[58] Field of Search ............ 296/63, 64, 65 R, 65 A, 296/37.1, 37.8, 37.16; 297/232, 238, 234

[56] References Cited

U.S. PATENT DOCUMENTS

| | | | |
|---|---|---|---|
| 461,832 | 10/1891 | Hatch | 297/234 |
| 1,337,295 | 4/1920 | Turner | 297/94 |
| 2,140,968 | 12/1938 | Paranzino | 296/65 R X |
| 2,525,952 | 10/1950 | Saterlie et al. | 296/37.8 X |
| 2,966,201 | 12/1960 | Strahler | 297/238 |
| 3,822,911 | 7/1974 | Radke et al. | 296/66 |
| 3,951,450 | 4/1976 | Gambotti | 297/238 |
| 4,555,135 | 11/1985 | Freeland | 297/238 X |
| 4,558,905 | 12/1985 | Natori | 297/219 X |

FOREIGN PATENT DOCUMENTS

| | | | |
|---|---|---|---|
| 3215488 | 11/1983 | Fed. Rep. of Germany | 297/238 |
| 0057537 | 5/1981 | Japan | 296/37.8 |

Primary Examiner—Robert B. Reeves
Assistant Examiner—Russell D. Stormer
Attorney, Agent, or Firm—John M. Harrison

[57] ABSTRACT

A rotating child's seat for mounting in the seat backrest of a vehicle, which rotating child's seat includes a rotating frame having a seat portion attached to one side thereof and a padded back portion secured to the opposite side. The rotating frame is rotatably mounted on fixed supports located in a bifurcation provided in the center section of the seat backrest. When located in functional configuration, the seat portion of the rotating child's seat faces forwardly of the backrest and extends over the rear bench seat in the vehicle to position a child securely in the back seat of the vehicle. When the rotating child's seat is not in use the rotating frame can be rotated or pivoted on pivot pins linking the rotating frame to the fixed supports, in order to position the back portion in alignment with the bifurcated backrest to accommodate one or more additional adults in the rear seat of the vehicle.

17 Claims, 5 Drawing Figures

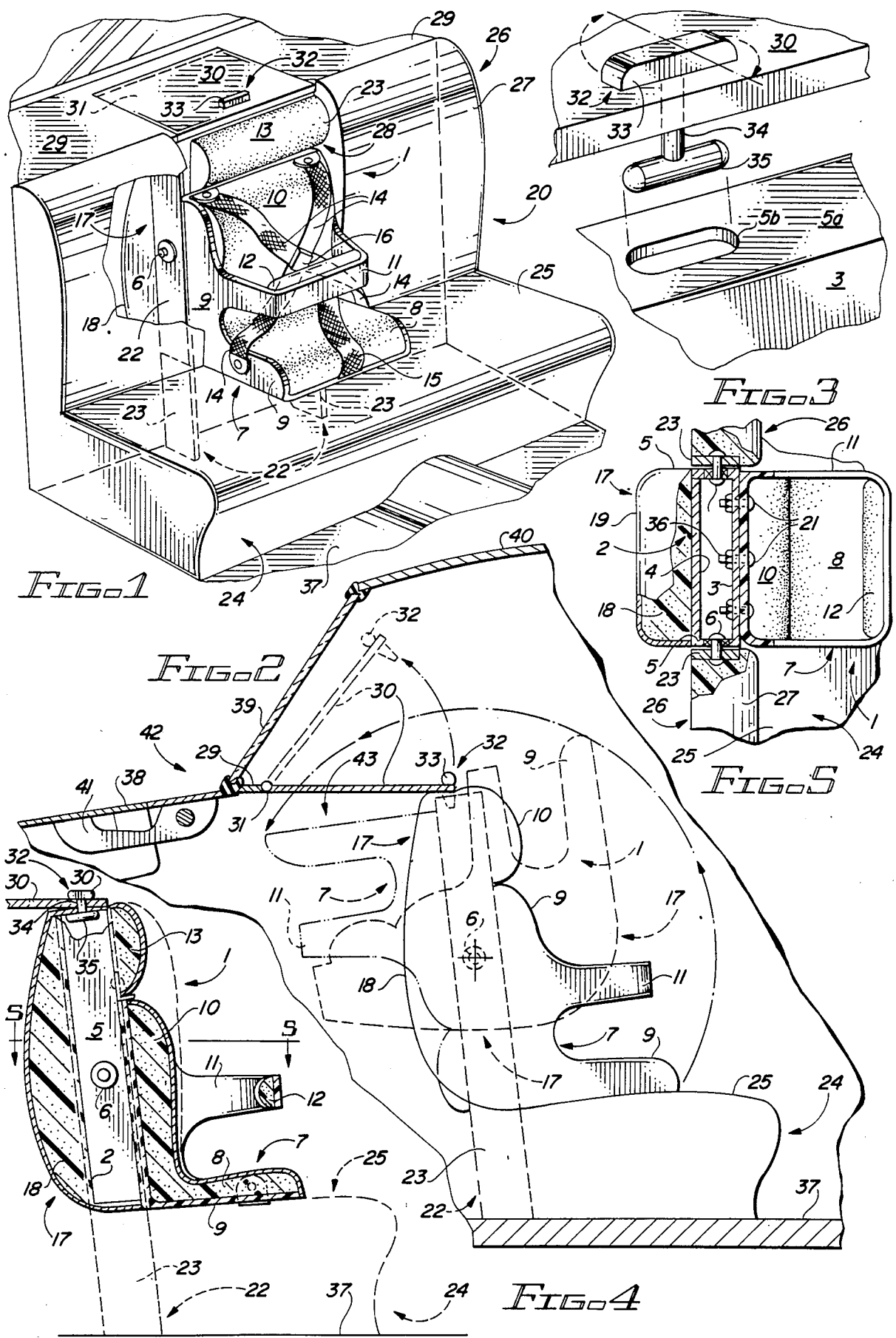

ROTATING CHILD'S SEAT

BACKGROUND OF THE INVENTION

1. Field of the Invention

This invention relates to vehicle seats for infants and children and more particularly, to a rotating child's seat which is mounted in the front or rear seat backrest of a vehicle. In a preferred embodiment the rotating child's seat is rotatably or pivotally mounted in a bifurcation provided in the rear seat backrest above the rear bench seat of the vehicle. When the rotating child's seat is in use, an infant or child is strapped in the seat portion thereof while the seat portion is oriented forwardly of the backrst and above the bench seat. The seat portion of the rotating child's seat is fitted with conventional shoulder straps and a leg divider strap and in a preferred embodiment is designed to rotate or pivot to a stored and nonfunctional position in the vehicle trunk when not in use. When the rotating child's seat is so positioned in the trunk of the vehicle, a back portion rotates or pivots into alignment with the backrest pads of the backrest to accommodate an additional adult or adults on the back seat of the vehicle. A panel latch and hinged access panel in the trunk divider serve to facilitate rotation or pivoting of the rotating child's seat into functional and stored configuration, respectively.

One of the problems associated with the use of portable seats and similar structures known as "car seats" for carrying infants and children in vehicles, is that of properly supporting and stabilizing the car seats on the front or rear seats of a vehicle. Typically, straps, bars and harness of various description are used to engage the vehicle seats in order to immobilize or at least partially stabilize the car seats such that children can be placed in, transported and removed from the seats at the convenience of the parents with at least some degree of security. A disadvantage found in car seats and carriers of this design is the requirement of periodically tightening the straps or harness to secure the car seats in place and subsequently loosening the straps or harness to remove the seats when it is desired to provide room for one or more additional adults. Furthermore, under circumstances of severe braking or acceleration of the vehicle, the straps and securing harness or bars of the infant seat or carrier sometimes work loose and llow the carrier to fall forward or sideways while the vehicle is in motion, sometimes resulting in injury to the infant or child. This problem is intensified under circumstances where the straps or harness are periodically loosened to remove the carrier from the vehicle. Legislation requiring that children and infants be secured in a properly designed car set has recently been enacted.

2. Description of the Prior Art

Various types of removable or foldable vehicle seats are known in the prior art. Among these is the "Car Seat" disclosed in U.S. Pat. No. 1,337,295, dated Apr. 20, 1920, to C. H. Turner. The Turner car seat is designed to accommodate the motorman or car operator in vehicles such as street cars and the like and is characterized by a pivoting auxiliary seat which is mounted to a conventional vehicle seat and is designed to pivot into functional configuration for driver seating purposes and alternatively, into folded configuration to accommodate a passenger.

Another "Vehicle Seat" is disclosed in U.S. Pat. No. 461,832, dated Oct. 27, 1891, to G. E. Hatch. The Hatch vehicle seat is a supplemental seat which is arranged and supported over the main seat in a vehicle in such a manner as to leave practically the full seating space of the main seat for use of the persons occupying it. The supplemental seat is supported by a narrow frame, part of which rests on the primary seat and another element of which engages the underside of the primary seat for support purposes. The vehicle seat is designed to fold flat for storage in another location.

U.S. Pat. No. 3,951,450, dated Apr. 20, 1976, to Paul Gambotti, discloses a "Infant Seat For Automotive and Other Vehicles". This seat is designed for an automobile or other vehicle and is mounted in an open recess in the back of a primary vehicle seat. The infant seat is folded and articulated in this recess such that it may be received fully in the recess or alternatively extended from the recess to accommodate a child.

It is an object of this invention to provide a rotating child's seat for installation in vehicles wherein the rotating child's seat is designed to selectively rotate or pivot into a functional configuration above the bench seat of the vehicle and into a nonfunctional configuration either into the trunk, when the child's seat is mounted in the rear seat backrest, or rearwardly of the front seat backrest, when the child's seat is mounted in the front seat backrest.

Another object of this invention is to provide a new and improved child's seat for vehicles, which child's seat is rotatably or pivotally mounted in the backrest of either the front or back seat of the vehicle, such that the child's seat can be selectively rotated or pivoted into functional configuration above the bench seat and a child placed therein and securely strapped thereto and the child's seat alternatively rotated or pivoted rearwardly of the backrest into the trunk of the vehicle or rearwardly of the front seat, when not in use.

Still another object of this invention is to provide a rotating child's seat which is rotatably mounted in a bifurcation provided in the backrest of the rear seat of a vehicle, wherein a child can be strapped into the child's seat when the child's seat is located in functional configuration over the bench seat and when the child's seat is not in use, it can be rotated into the trunk and a cooperating contoured back portion of the child's seat rotated into the bifurcation in alignment with the vehicle seat backrest.

Yet another object of the invention is to provide a rotating child's seat which is pivotally mounted in a slot or bifurcation provided in the rear backrest of a vehicle seat, which rotating child's seat is provided with a seat portion for accommodating an infant or child and a back portion which corresponds substantially to the curvature of the vehicle seat backrest, wherein the rotating child's seat can be pivoted into functional configuration to carry a child on the seat portion thereof, or into a stored configuration in the trunk, with the contoured back portion provided in alighment with the backrest pad of the seat backrest.

A still further object of this invention is to provide a rotating child's seat for vehicles, which child's seat is rotatably and pivotally mounted in an opening in the rear backrest of a vehicle seat, with a hinged access panel provided in the trunk divider to both stabilize the child's seat and facilitate rotation and pivoting of the child's seat such that the seat portion is oriented into functional configuration above the bench seat and selectively into non-functional configuration in the trunk of the vehicle.

SUMMARY OF THE INVENTION

These and other objects of the invention are provided in a new and and improved child's seat which is designed for rotational movement in a slot or bifurcation provided in the backrest of a vehicle and is characterized by a seat portion for accommodating an infant or child and a back portion, which seat portion and back portion can be selectively rotated or pivoted in the bifurcation into functional configuration above the bench seat, as desired. In a most preferred embodiment an access panel is provided in the trunk divider to both stabilize the child's seat in a selected orientation and facilitate rotation or pivoting of the child's seat in the bifurcation.

BRIEF DESCRIPTION OF THE DRAWING

The invention will be better understood by reference to the accompanying drawing, wherein:

FIG. 1 is a perspective view, partially in section, of a preferred embodiment of the rotating child's seat of this invention installed in the backrest of a rear seat in a vehicle;

FIG. 2 is a sectional view of the rotating child's seat and the rear seat and body portion of a vehicle, more particularly illustrating a preferred range of rotation of the child's seat illustrated in FIG. 1;

FIG. 3 is a perspective, exploded view of a preferred latch and access panel configuration for both stabilizing and implementing rotation of the rotating child's seat;

FIG. 4 is a side sectional view of the rotating child's seat illustrated in FIG. 1; and FIG. 5 is a top sectional view, taken along line 5—5, of the rotating child's seat illustrated in FIG. 4.

DESCRIPTION OF THE PREFERRED EMBODIMENTS

Referring initially to FIGS. 1, 3 and 5 of the drawing the rotating child's seat of this invention is generally illustrated by reference numeral 1. As illustrated in FIGS. 3 and 5, the rotating child's seat 1 is characterized by a rotating frame 2 having a front panel 3, a rear panel 4, side panels 5 and a top panel 5(a), fitted with a top panel slot 5(b). The perimeter of the rotating frame 2 is closed by a bottom panel (not illustrated) which is also provided with a slot (not illustrated) for securing the rotating child seat 1 in non-functional, stored configuration, as hereinafter described. Pivot pins 6 are provided in oppositely-disposed relationship in the side panels 5 and are secured to parallel pivot panels 23, which are mounted in a backrest slot 28, provided in the backrest 26 of a rear vehicle seat 20. The pivot panels 23 are optionally secured to the floor 37 of the vehicle 42. In a preferred embodiment, the pivot panels 23 extend throughout the width of the backrest 26 and downwardly through the bench seat 24 for anchoring to the floor 37 of the vehicle 42. Accordingly, the rotating frame 2 can be rotated or pivoted with respect to the pivot panels 23 on the pivot pins 6 to selectively position the rotating child's seat 1 into both a functional and nonfunctional configuration, as hereinafter described.

In another preferred embodiment of the invention the rotating child's seat 1 is further characterized by a seat portion 7, provided with a seat pad 8 for supporting an infant or child, which seat pad 8 is located in a seat frame 9. A ack pad 10 is fitted into the upper portion of the seat frame 9 and an arm rest 11 extends from the seat frame 9 in parallel relationship with respect to the seat pad 8, in order to accommodate an arm pad 12, as illustrated. A head pad 13 is also provided in the rotating frame 2 above the top edge of the seat frame 9. Shoulder straps 14 are mounted diagonally across the back pad 10 and are secured at bot ends to the seat frame 9 in conventional fashion. The buckle 16 serves to secure the free ends of the should straps 14 together, in order to accommodate a child or infant securely against the back pad 10 and seated on the seat pad 8. A divider strap 15 serves to separate the legs of the infant or child and prevent the infant or child from sliding beneath the shoulder straps 14 and from the rotating child's seat 1 in the event of sudden braking or swerving of the vehicle 42. The rotating child's seat 1 is further provided with a contoured back portion 17 which is mounted on the opposite side of the rotating frame 2 and is designed to align with the backrest pad 27 of the backrest 26, when the seat portion 7 of the rotating child's seat 1 is rotated or pivoted rearwardly into the trunk 43 of the vehicle 42, as illustrated in FIG. 2. Accordingly, in a most preferred embodiment of the invention,t he back portion pad 18 of the back portion 17 is provided with a contour which approximates the contour of the back rest pad 27 of the back rest 26, to accommodate one or more additional adults when the rotating child's seat 1 is positioned in the trunk 43 of the vehicle 42 in nonfunctional orientation.

As further illustrated in FIG. 5 in another most preferred embodiment of the invention, mount bolts 21 are used along with cooperating nuts 36 to secure the seat portion 7 of the rotating child's seat 1 to the front panel 3 of the rotating frame 2. Accordingly, it will be appreciated that various seat portion 7 designs can be used in cooperation with a common rotating frame 2 according to the teaching of this invention, depending upon the size of the child which will occupy the respective seat portion 7.

Referring now to FIGS. 1–4 of the drawing in yet another most preferred embodiment of the invention, the rotating child's seat 1 is mounted in the backrest 26 of the rear vehicle seat 20 of a vehicle 42, such as an automobile. The seat portion 7 of the rotating child's seat 1 is located over the bench seat pad 25 of a conventional bench sat 24. Under these circumstances, an access panel 30 is attached to the trunk divider 29 of the vehicle 42 by means of a panel hinge 31 and is secured to the top panel 5(a) of the rotating frame 2 by means of a panel latch 32. The panel latch 32 is further characterized by a latch grip 33 and a cooperating latch pin 34, which extends downwardly through the access panel 30 from the latch grip 33. A latch retainer 35 is fitted to the extending end of the latch pin 34 and is designed to register with the top panel slot 5(b) provided in the top panel 5(a) of the rotating frame 2. Accordingly, the access panel 30 can be secured to the rotating frame 2 by extending the latch retainer 35 and latch pin 34 through the top panel slot 5(b) and rotating the latch grip 33. Conversely, when it is desired to rotate or pivot the seat portion 7 of the rotating child's seat 1 into the trunk 43 of the vehicle 42, the latch grip 33 can be manipulated to aling the latch retainer 35 with the top panel slot 5(b) and the access panel 30 lifted on the panel hinge 31 to facilitate the desired adjustment, as hereinafter further described. As further illustrated in FIG. 2, for purposes of illustration, the rotating child's seat 1 is mounted in the vehicle 42 forwardly of and beneath the rear window 39 and below the rear section of the roof 40. A portion of the trunk lid 38 is also illustrated, along with the trunk hinge 41, in order to better visualize the preferred path of rotation of the rotating child's seat 1 in the vehicle 42.

In operation and referring again to the drawing, the rotating child's seat 1 is manipulated with respect to the rear vehicle seat 2 in the vehicle 42 as follows. If the rotating child's seat 1 is positioned as illustrated in FIGS. 1, 2, 4 and 5 of the drawing, with the seat portion 7 facing forwardly in functional configuration, the latch grip 33 in the panel latch 32 is initially rotated to align the latch retainer 35 with the top panel slot 5(b) located in the top panel 5(a) of the rotating frame 2. The access panel 30 is then lifted on the panel hinge 31 to the position illustrated in phantom in FIG. 2 to provide access through the trunk divider 29 for rotating the rotating child's seat 1 on the pivot pins 6. The rotating child's seat 1 is then rotated or pivoted in a counterclockwise direction, as illustrated in FIG. 2, to a position such that the back portion 17 is located in alignment with the backrest pad 27 of the backrest 26. The latch retainer 35 is then inserted in a second slot (not illustrated) provided in the bottom panel (not illustrated) of the rotating frame 2 to secure the seat portion 7 of the rotating child's seat 1 in the trunk 43 of the vehicle 42 and the back portion 17 in the backrest slot 28. Reorientation of the seat portion 7 of the rotating child's seat 1 into the configuration illustrated FIG. 1 is achieved by reversing the procedure outlined above.

Referring again to FIG. 2 of the drawing, while the rotating child's seat 1 can be designed to facilitate a full 360 degree rotation in the backrest slot 28, a more limited range of pivot to the extent of only 180 degrees is necessary in order to locate either the seat portion 7 or the back portion 17 in the trunk 43 of the vehicle 42, as heretofore described. Hence, the rotating child's seat 1 can be either rotatably or pivotally adjusted in the backrest slot 28 depending upon the desired design of the rotating frame 2, seat portion 7 and back portion 17.

It will be appreciated by those skilled in the art that although illustrated in cooperation with a rear vehicle seat 20, the rotating child's seat 1 of this invention is also capable of being mounted in the backrest 26 of a front vehicle seat (not illustrated) a vehicle. However, in a most preferred embodiment the rotating child's seat 1 is mounted in the backrest 26 of the rear vehicle seat 20, in order to facilitate rotation of the seat portion 7 into the trunk 43 of the vehicle 42 and the pack portion 17 into alignment with the backrest pad 27, when it is desired to accommodate an additional adult or adults on the rear vehicle seat 20. However, under circumstances where the rotating child's seat 1 is positioned in the backrest 26 of a front vehicle seat, it will be appreciated that the seat portion 7 is rotated or pivoted rearwardly of the front vehicle seat and immediately forwardly of the rear vehicle seat 20 instead of in the trunk 43, when the rotating child's seat 1 is rotated or pivoted into the non-functional configuration.

It will be further appreciated by those skilled in the art that the rotating child's seat 1 of this invention provides a simple, positive and expedient means of supporting an infant or child in a secure manner in a vehicle, while at the same time providing the option of seating another adult or adults on the rear vehicle seat 20 in a quick and efficient manner. Furthermore, the rotating child's seat 1 is simple in deisgn and can be easily installed in existing vehicles by modifying only the backrest 26 of the rear vehicle seat 20, since the pivot panels 23 can be designed for compatibility with the shape and design of any rear vehicle seat 20, according to the knowledge of those skilled in the art. Furthermore, the seat frame 9 of the seat portion 7 can be shaped from conventional plastic materials into a desired configuration according to the knowledge of those skilled in the art and the back portion 17 can be upholstered and contoured to match the backrest pad 27 of the backrest 26 by conventional techniques.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A rotating child's seat for vehicles having a storage area and at least one bench seat with a cooperating backrest, said rotating child's seat comprising seat means adapted to support a child, an opening provided in the bench seat for receiving said seat means and pivot means carried by the bench seat, said pivot means engaging said seat means near the center of said seat means in transverse relationship, and an access panel having one end carried by said vehicle and the opposite end of said access panel engaging said seat means and latch means carried by said access panel for securing said opposite end of said access panel to said seat means, whereby said seat mens is selectively rotated on said pivot means throug an arc of substantially 180° into a first functional orientation over the bench seat in the vehicle and into a second stored configuration in the storage area of the vehicle responsive to manipulation of said latch means to release said opposite end of said access panel from said seat means and open said access panel.

2. The rotating child's seat of claim 1 further comprising a pair of substantially vertically oriented supports provided in spaced, substantially parallel relationship in said opening and wherein said pivot means is carried by said supports and said seat means is rotatably disposed between said supports.

3. The rotating child's seat of claim 1 wherein said seat means is further characterized by a rotating frame and a seat portion carried by one side of said rotating frame, said seat portion contoured to receive a child.

4. The rotating child's seat of claim 3 further comprising a back portion carried by the opposite side of said rotating frame, said back portion contoured to substantially conform to the shape of the backrest.

5. The rotating child's seat of claim 4 further comprising a pair of substantially vertically oriented supports provided in spaced, substantially parallel relationship in said opening and wherein said pivot means is carried by said supports and said rotating frame is rotatably disposed between said supports.

6. The rotating child's seat of claim 5 further comprising fastening means extending through said seat portion and said rotating frame for securing said seat portion to said rotating frame.

7. The rotating child's seat of claim 1 further comprising a pair of sustantially vertically oriented supports provided in spaced, substantially parallel relationship in said opening and wherein said seat means is further characterized by a rotating frame disposed between said supports and said pivot means is rotatably attached to said supports and to said rotating frame and further comprising a seat portion carried by one side of said rotating frame, said seat portion being contoured to receive a child.

8. The rotating child's seat of claim 7 further comprising fastening means extending through said seat portion and said rotating frame for securing said seat portion of said rotating child's seat to said rotating frame.

9. A rotating child's seat for vehicles having a bench seat and a divided backrest provided in upward standing relationship with respect to the bench seat, said rotating child's seat comprising seat means adapted to support a child, pivot means provided substantially in the center of said seat means in transverse relationship, said pivot means projecting into the divided backrest, and said seat means pivotally supported in the divided backrest, an access panel having one end hingedly carried by said vehicle and the opposite end of said access panel engaging said seat means and latch means carried by said access panel for securing said opposite end of said access panel to said seat means, whereby said seat means is selectively pivoted into functional and nonfunctional orientation with respect to the bench seat responsive to manipulation of said latch means to release said opposite end of said access panel and opening said access panel.

10. The rotating child's seat of claim 9 further comprising a pair of substantially vertically oriented supports provided in spaced, substantially parallel relationship in the divided backrest and wherein said seat means is pivotally disposed between said supports.

11. The rotating child's seat of claim 9 wherein said seat means is further characterized by a rotating frame carrying said pivot means, said rotating frame being pivotally mounted in the divided backrest and a seat portion carried by one side of said rotating frame, said seat portion contoured to receive the child.

12. The rotating child's seat of claim 11 further comprising a back portion by the opposite side of said rotating frame, said back portion contoured to substantially conform to the shape of the backrest.

13. The rotating child's seat of claim 9 further comprising a pair of substantially vertically oriented supports provided in spaced, substantially parallel relationship in the divided backrest and wherein said seat means is further characterized by a rotating frame carrying said pivot means, said rotating frame disposed between said supports and pivotally attached to said supports and a seat portion carried by one side of said rotating frame, said seat portion contoured to receive the child.

14. The rotating child's seat of claim 13 further comprising fastening means extending through said seat portion and said rotating frame for securing said seat portion of said rotating child's seat to said rotating frame.

15. A rotating child's seat for mounting in the backrest of a rear bench seat in a vehicle, the backrest separating the interior of the vehicle from the trunk of the vehicle, said child's seat comprising an opening in the backrest; a pair of substantially vertically oriented supports provided in spaced relationship in said opening; a pair of pivot pins pivotally carried by said support in spaced, transverse relationship, respectively; seat means fixedly attached to said pivot pins near the center of said seat means, and an access panel having one end hingedly carried by said vehicle and the opposite end of said access panel engaging said seat means and latch means carried by said access panel for securing said opposite end of said access panel to said seat means, whereby said seat means is adapted to selectively rotate in said opening through an arc of about 180° responsive to manipulation of said latch means to release said opposite end of said access panel from said vertically oriented supports and opening said access panel.

16. The rotating child's seat of claim 15 wherein said seat means is further characterized by a rotating frame pivotally attached to said supports, a seat portion carried by one side of said rotating frame and a back portion carried by the opposite side of said rotating frame, whereby said seat portion and said back portion are selectively rotated into the interior and into the trunk of the vehicle.

17. The rotating child's seat of claim 16 further comprising fastening means extending through said seat portion and said rotating frame for securing said seat portion of said rotating child seat to said rotating frame.

* * * * *